United States Patent [19]

Sorenson

[11] Patent Number: 4,567,856

[45] Date of Patent: Feb. 4, 1986

[54] APPARATUS FOR SPRAYING LIVESTOCK

[76] Inventor: Wally B. Sorenson, R.R. 1, Lake Preston, S. Dak. 57249

[21] Appl. No.: 654,169

[22] Filed: Sep. 24, 1984

[51] Int. Cl.$^4$ .................... A61D 7/00; A01K 29/00
[52] U.S. Cl. ................................................ 119/159
[58] Field of Search ..................... 119/158, 159, 160

[56] References Cited

U.S. PATENT DOCUMENTS

| | | | |
|---|---|---|---|
| 1,566,558 | 12/1925 | Peck et al. | 119/159 |
| 3,032,011 | 5/1962 | Stramel | 119/159 |
| 3,173,402 | 3/1965 | Cassel | 119/157 |
| 3,602,199 | 8/1971 | Diggs | 119/159 |
| 3,699,928 | 10/1972 | Cowan | 119/159 |
| 3,821,940 | 7/1974 | Mann | 119/159 |
| 3,870,023 | 3/1975 | Wilson | 119/159 |
| 4,126,104 | 11/1978 | Overby | 119/159 |
| 4,334,504 | 6/1982 | Matthews | 119/159 |
| 4,459,942 | 7/1984 | Cauthron | 119/159 |

*Primary Examiner*—Robert P. Swiatek
*Attorney, Agent, or Firm*—Merchant, Gould, Smith, Edell, Welter & Schmidt

[57] ABSTRACT

Apparatus for spraying livestock with liquid substances is disclosed. A liquid insecticide tank is mounted on a supporting base. A housing is provided mounted on top of the tank, with a housing covering a trough or container provided for holding feed or another substance to be ingested by an animal. A liquid propane tank is mounted to the housing and is connected to provide a regulated pressure to the liquid tank. A three-wave bulb valve is mounted to extend above and forward of the housing and is connected at one port to the liquid under pressure, at another port to a spray nozzle, and at a third port to an upwardly extending chamber providing a vertical air column. Position of the valve is controlled by a mechanical linkage operated by a hinged face flap which an animal must move out of the way in order to access the substance to be ingested. In a normal or inactive condition the valve provides fluid communication between the chamber and the pressurized liquid such that a quantity of liquid is pushed up into the chamber to press the air column. When an animal moves the face flap out of the way to access the substance the valve is moved by the mechanical linkage to a second position in which the chamber is in fluid communication with the spray nozzle whereby the quantity of liquid is propelled by the compressed column out the spray nozzle over the animal.

10 Claims, 6 Drawing Figures

APPARATUS FOR SPRAYING LIVESTOCK

TECHNICAL FIELD

Present relates generally to the field of spraying apparatus for livestock, and more particularly to spraying apparatus providing a metered dose of spray.

BACKGROUND OF THE INVENTION

One important aspect of livestock farming involves the treatment of the animals with insecticides and other substances. Proper care requires that certain treatments, particularly insecticide spraying, be done on a regular basis due to the limited effective lifetime of the substance applied as affected by natural chemical degradation of the substance and by the dilution or washing away of the substance through rain, mud or the washing of the animals. Application of insecticide and other such substances is commonly accomplished by rounding up the livestock and spraying with a hand-held sprayer, which job is time consuming and even worse unpleasant. Accordingly, there are available a number of automatic spraying systems and devices, as demonstrated by the prior art.

U.S. Pat. No. 3,032,011 to Stramel; U.S. Pat. No. 3,173,402 to Cassel; U.S. Pat. No. 3,870,023 to Wilson; and U.S. Pat. No. 4,334,504 to Matthews all disclose automatic livestock spraying apparatus for spraying a liquid insecticide over the body of an animal. In the case of U.S. '402 to Cassel a relatively complicated apparatus is provided to utilize the weight of an animal to pressurize the insecticide to be sprayed, and to utilize the movement of an animal through the device to release the pressurized insecticide in spray form at the appropriate time. The relative complexity of that apparatus makes it undesireable from both a cost and maintenance viewpoint. In the case of U.S. '011 to Stramel a somewhat simpler apparatus is provided in which a pressurized tank is provided to hold liquid insecticide, which is directed through a valve to spray nozzle. The valve is operated through a linkage including a trip mechanism which when displaced by an animal moving its head into a salt lick container, opens the valve to permit pressurized insecticide to be sprayed over the animal's body. While somewhat simpler then the Cassel apparatus, the Stramel apparatus does not provide for a uniform metered dose of insecticide to be sprayed over the animal, and thus can result in either too little or too much insecticide being applied per treatment. The apparatus of U.S. '504 to Matthews discloses another pressurized liquid insecticide system utilizing an insecticide valving system wherein the valve is opened by an animal, in this case the body of the animal as it passes by the spraying apparatus. Like the Stramel apparatus, the Matthews apparatus relies on the somewhat erratic movement of the animal to both activate and deactivate the spraying apparatus such that a uniform dose of insecticide treatment is not assured.

U.S. '023 to Wilson does, however, disclose apparatus which provides for the application of a uniform dose of insecticide to an animal. The Wilson system includes an electrical pump and time delay circuit for this purpose, requiring a battery or other source of energy. In the case where batteries are utilized it is thus necessary to change or recharge them on a regular basis, or in the case of A.C. power a line must be run to the spraying device, either of which requirements are less than ideal. Moreover, electronic components of delay circuits are to some extent temperature sensitive such that fluctuations in the ambient temperature may effect the operation of the device, and are also subject to corrosion of the contacts, another source of malfunction. Moreover, electrical components of the system are relatively expensive as compared to for instance, the simpler mechanical valving apparatus of Matthews or Stramel.

SUMMARY OF THE INVENTION

The present invention comprises apparatus for spraying liquid substances over livestock in which a metered dose is applied to an animal during each treatment. The invention utilizes a relatively simple mechanical design not requiring electrical timing circuits. According to one aspect of the invention it includes a source of pressurized liquid to be sprayed on an animal and a spray nozzle for receiving pressurized liquid and dispersing it over an animal to be treated. Liquid dose metering means is provided and is in fluid communication with the source of pressurized liquid and the spray nozzle. The metering means has a first position in which it receives a quantity of energy and liquid from the pressurized source and a second position in which it is in fluid communication with the spray nozzle. The metering means includes means for storing the quantity of energy received when it is in its first position, with the stored energy being used while the metering means is in its second position to propel the quantity of liquid from the metering means to the spray nozzle means. The position of the metering means is controlled such that it is normally maintained in the first position, and such that it may be moved to the second position in response to contact with an animal to be sprayed, or under operator control if desired.

According to another aspect of the invention the metering means includes a three-way ball valve having an inlet port in fluid communication with the source of pressurized fluid and an outlet port in fluid communication with the spray nozzle. A third port of the three-way ball valve is connected to a chamber oriented to provide a sealed vertical air column of preset volume, with said the column being positioned vertically above the valve. According to this aspect, the valve has a first position providing a fluid path between the inlet port and the chamber port and a second position blocking the inlet port and providing a fluid path between the chamber port and the spray nozzle so that when the valve is in the first position the source of pressurized liquid propells the quantity of liquid into the chamber to compress the air column whereby the energy is stored in the column, and whereby the energy is used to propel the quantity of liquid from the chamber when the valve is moved to the second position.

According to yet another aspect of the invention the metering means and spray nozzle are mounted on animal feeding apparatus and means are provided to be responsive to contact with a feeding animal to move the metering means or valve from its normal first position to the second activated position. In its more detailed aspects the invention provides a hinged animal face flap which is mechanically linked to the metering means or valve for this purpose, with the face flap positioned such that an animal must move it out of the way to reach the feed, and thus move the valve or metering means to the second activated position.

Thus, the present invention provides a relatively simple mechanical apparatus for spraying a metered dose of a liquid substance over an animal to be treated. In this respect the invention is superior to prior art spraying apparatus as it assures a uniform dose to be delivered to an animal without depending on potentially troublesome electrical components or complicated mechanical arrangements. The above-described and other salient features, including more subtle aspects of the invention, are shown and described below in the ensuing drawing and specification.

DETAILED DESCRIPTION OF THE INVENTION

The present invention is provided for treating livestock by spray application of liquid substances, for example insecticides. In its perferred embodiment the invention takes advantage of a selected habit of an animal to provide the automatic application of a liquid spray treatment as the animal engages in the practice of the habit. Specifically, the present invention is designed to apply liquid insecticide to cattle as they ingest salt at a salt lick, the practice of that habit generally corresponding in regularity to the regularity at which liquid spray insecticide treatment should be administered to each head in order to ensure their proper care. It shall be understood, however, that the invention is not limited in regard to the particular habit taken advantage of to trigger the application of a spray treatment or even to an embodiment in which the animal itself causes the treatment to be delivered. Nor is the invention limited to the application of insecticides.

Figure 1:
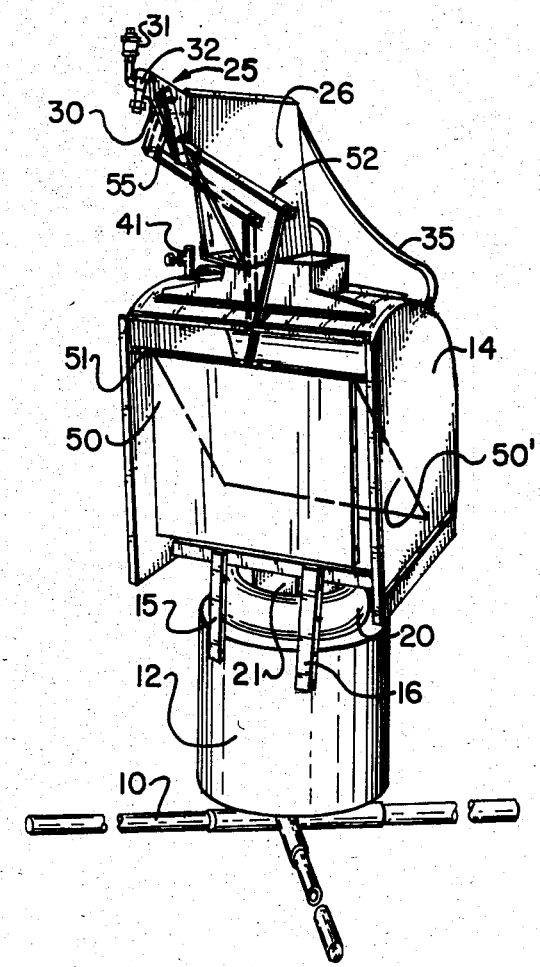
FIG. 1 is a front perspective view of the livestock spraying apparatus according to present invention.
Figure 2:
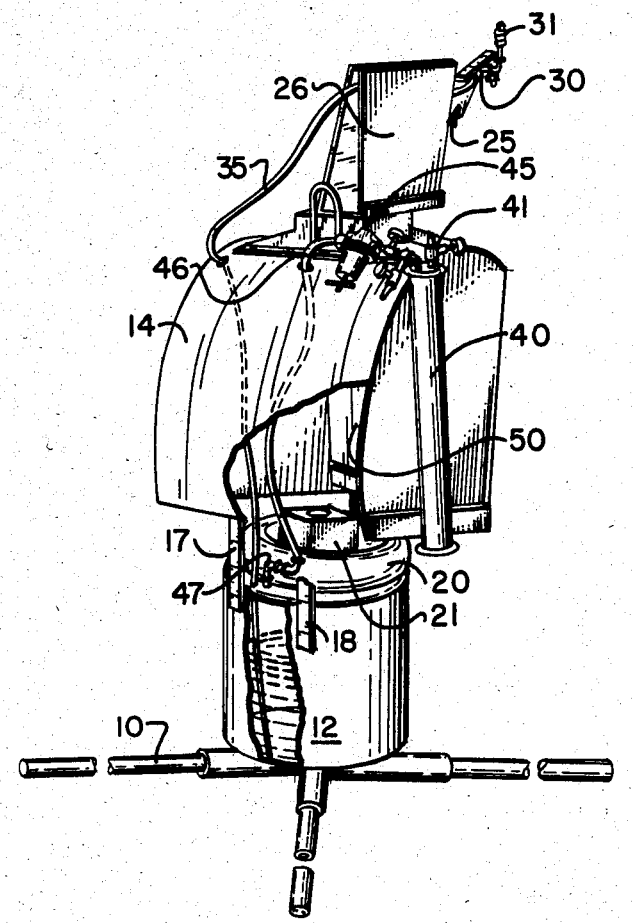
FIG. 2 is a rear perspective view with portions cut away of the livestock spraying apparatus according to the present invention.

Referring to FIGS. 1 and 2 the apparatus of the present invention is shown in front and rear perspective views. A base support 10 is provided to support a tank 12 for containing liquid substances to be used in treating an animal. A shroud or housing 14 is provided and is mounted atop tank 12 by bracket members 15-18, which may be welded or otherwise fastened to the tank 12 and housing 14. A feed trough or container 20 is provided and is positioned atop tank 12 and covered overhead by housing 14, such that feed or salt 21 disposed in container 20 is sheltered from the elements and such that an animal may access container 20 from only the front of the housing, as explained further below.

Spray control or metering apparatus 25 is mounted via a mounting member 26 to be positioned above and forward of the housing 14. As will be explained in more detail with reference to FIGS. 3 and 4, spray apparatus 25 includes a three-way ball valve 30, an upwardly extending chamber 31 consisting of a short length of pipe sealed on the top end and connected to one port of valve 30, and a spray nozzle 32 connected to an outlet port of valve 30. Valve 30 is further connected at an inlet port through a hose or tube 35, which opens on its other end near the bottom of tank 12, so as to be in fluid communication with the liquid substance contained therein.

A source of pressurized gas 40 is provided, which preferably consists of a liquid propane tank mounted on one side of housing 14. Tank 40 includes a charging inlet 41 through which liquid propane may be introduced into the tank. A pressure regulator 45 is provided, and is connected in line between an outlet tank of port 40 and a hose 46, which is in fluid communication with a port 47 of tank 12. Pressure regulator 45 may be of any conventional type so as to maintain a uniform pressure in tank 12 via pressurized gas source 40.

Housing 14 further includes an animal face flap 50 which is hinged in the front of housing 14 via a rotatable hinge bar 51. A linkage 52 is provided between hinge bar 51 and a valve lever 55, in order to move valve 30 between positions as will be explained in more detail below.

Figure 3:
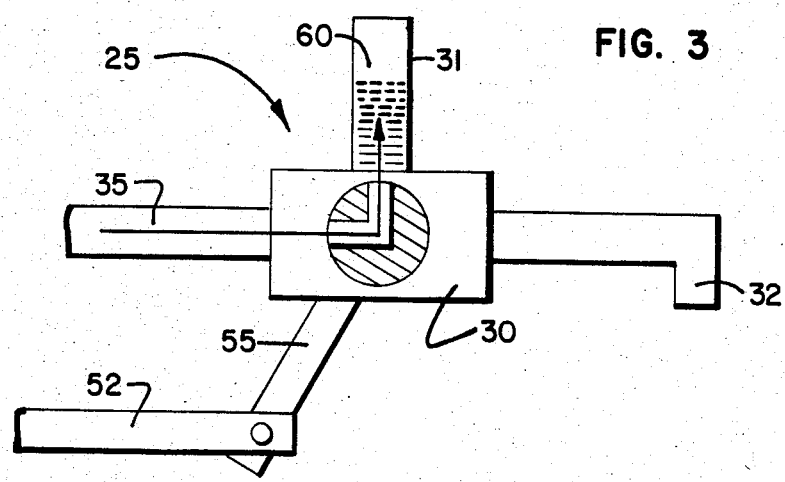
FIGS. 3 and 4 are cross sectional schematic views of the metering apparatus according to the present invention.
Figure 4:
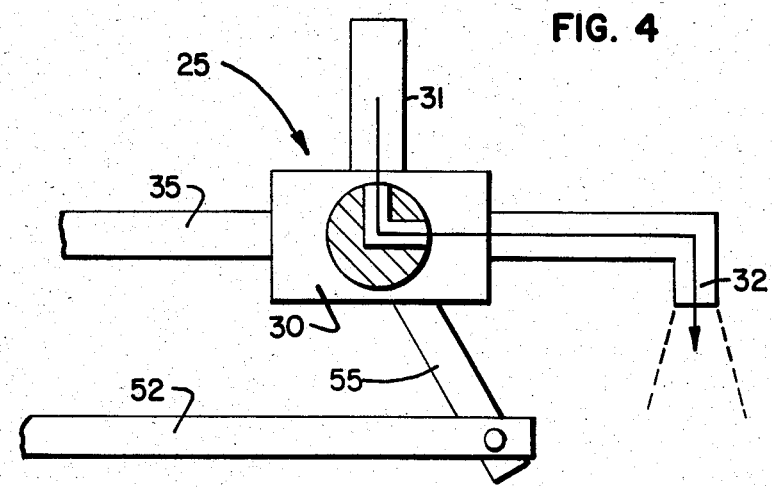

Referring now to FIGS. 3 and 4 the operation of spray apparatus 25 may been seen. Valve 30, as mentioned below, is a three-way ball valve having two different valving positions. In a first position, as shown in FIG. 3, the valve provides a fluid passageway between an inlet port connected to the feeder line 35 to a top port opening into chamber 31. In a second position as shown in FIG. 4, valve 30 provides a fluid passageway between chamber 31 to spray nozzle 32 via an outlet port, with the inlet port blocked. The valve is moved between the normal position of FIG. 3 to the activated position of FIG. 4 via linkage 52, which remains in the "normal" position as shown in FIGS. 1 and 2 by virture of the weight of face flap 50. Linkage 52 moves the valve 30 to the "activated" position when face flap 50 is pushed rearward toward the inside of the housing (50'), as accomplished by cattle as they reach their head into the housing to access the substance in container 20, which as mentioned above is preferably salt.

OPERATION

The above-described apparatus operates as follows. With face flap 50 in its normal hanging position valve 30 (FIG. 3) provides a fluid passageway between liquid feeder line 35 and chamber 31. In this mode of operation liquid from pressurized tank 12 is forced through feeder line 35 and valve 30 up into chamber 31. The quantity of liquid entering chamber 31 is limited by an air column 60 which is compressed by the encroaching liquid until there is a balance of pressure as between the compressed air in chamber 31 and the source of pressure provided by propane tank 40 and regulator 45. By this mechanism then, it may be seen that a quantity of liquid is maintained in the bottom portion of chamber 31 and a quantity of potential energy is maintained or stored in the air column 60, as generated by the pressure exerted on the liquid from tank 40.

When valve 30 is moved to the active position (FIG. 4), the quantity of liquid held in the bottom of chamber 31 is discharged from the chamber by the compressed air column 60, as occurs when a head of the cattle forces face flap 50 forward in order to access the substance in container 20. The liquid previously contained in the bottom portion of chamber 31 is discharged by the pressurized air column 60 through the spray nozzle 32, which is positioned to discharge the liquid over the back of the animal. As may be readily appreciated, the dosage of liquid to be applied to an animal may be varied by altering the volume of chamber 31; smaller doses may be provided by decreasing the volume while higher dosages may be provided by increasing the volume.

Figure 5:
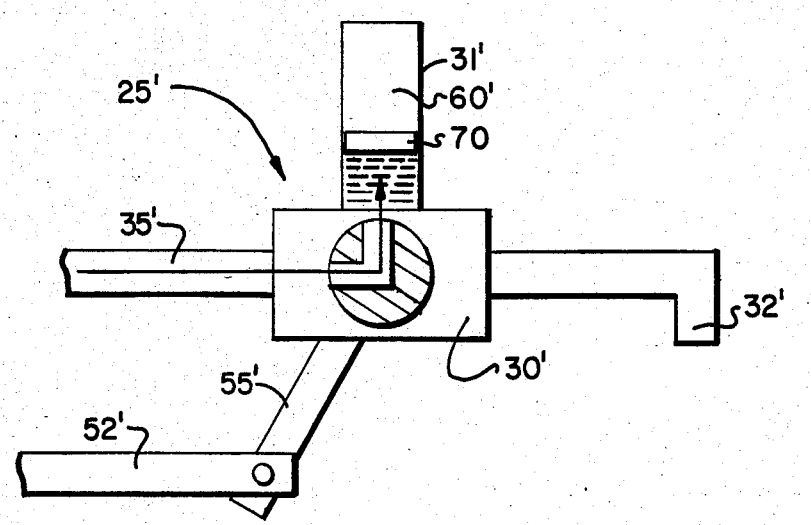
FIGS. 5 and 6 are cross sectional schematic views of alternate embodiments of the metering apparatus according to the present invention.
Figure 6:
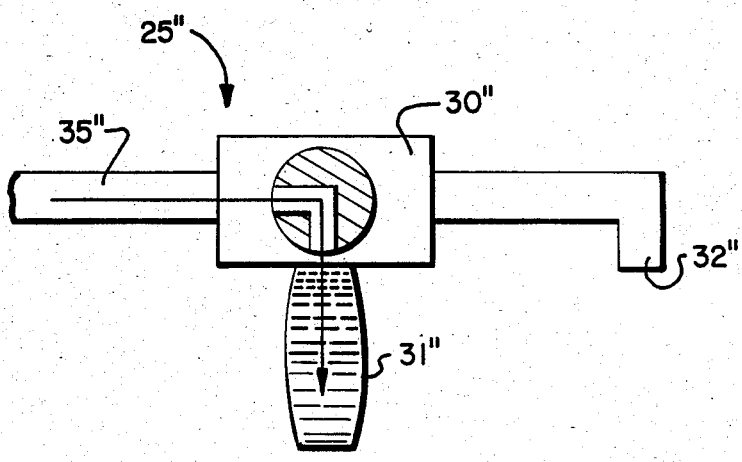

An alternate embodiment of the spray apparatus 25 may been seen with respect to FIGS. 5 and 6 in which like elements as between the embodiments of FIGS. 3 and 4, and FIGS. 5 and 6 have like reference numerals, only "primed". Alternate embodiment 25' is identical to apparatus 25 in all respects except that chamber 31' includes a floating piston 70, such that chamber 31' need not be oriented with its closed end elevated. In the embodiment of FIG. 5, a column of gas 60' is trapped between the closed end of chamber 31 and the floating piston 70 such that gravity is not required to prevent the gas in chamber 31' from being dispersed backward through valve 30 and into the feeder line 35 or tank 12. Another alternate embodiment is shown at FIG. 6, which is also identical in all respects to the embodiments of FIGS. 3 and 4 excepting the design of chamber 31. In the embodiment of FIG. 6, chamber 31" is adapted to extend downwardly or horizontally from valve 30", and is constructed of a elastic material, such as a balloonable rubber hose. In the operation of the embodiment of FIG. 6 liquid may thus fill the entire volume of chamber 31" with the elasticity of the chamber material chosen so that it expands to appropriate limits. Thus, when the valve is moved to the activated position the contraction of chamber 31" causes a certain quantity of insecticide to be forced through spray nozzle 32" until the walls of chamber 31" return to their normal unexpanded dimensions.

Thus, it may been seen that the invention in any of the embodiments described above provides a relatively simple spraying apparatus capable of delivering a controllable metered dose of spray to an animal to be treated. As mentioned above it shall be understood that the invention is not limited to utilization in an animal activated embodiment, and may be easily adapted for human operator activation. Furthermore, it is contemplated that other designs which utilize the broad idea of transferring propellant energy from the source of pressurized liquid to a second propellant energy device are possible. Moreover, it shall be understood that means other than liquid propane may be utilized to pressurize the liquid to be sprayed, and that a multitude of other schemes for activating the device via animal contact are possible. Finally, thus, it shall be understood that various changes and modifications to the invention may be made without departing from the spirit and scope of the invention as set forth in the claims appended hereto.

What is claimed is:

1. Apparatus for spraying livestock comprising:
   a source of pressurized liquid to be sprayed on an animal;
   spray nozzle means for receiving pressurized liquid and dispensing it over an animal to be treated;
   liquid dose metering means including a threeway valve and chamber means enclosing a gaseous column, said valve having an inlet port in fluid communication with said source of pressurized fluid, a chamber port in fluid communication with said chamber means and an outlet port in fluid communication with said spray nozzle means;
   said valve having a first position providing a fluid path between said inlet port and said chamber port and a second position blocking said inlet port and providing a fluid path between said chamber port and said outlet port;
   said chamber means oriented so that when said valve is in said first position said source of pressurized liquid propels a quantity of liquid into said chamber means to compress said gaseous column whereby energy is stored in said gaseous column and whereby said energy propels said quantity of liquid from said chamber means out said spray nozzle means when said valve is moved to the second position; and
   control means for controlling the position of said valve to normally maintain it in the first position and for moving it to the second position whereby a metered dose of said liquid is dispersed through said spray nozzle means.

2. Apparatus according to claim 1 wherein said chamber means forms a cylinder and wherein a floating piston is provided in said chamber means to provide a seal between said valve and said gaseous column.

3. Apparatus according to claim 2, wherein said control means includes means responsive to the movement of an animal to be treated to cause said metering means to move to the second position whereby the animals are treated automatically with a sprayed dose of said liquid.

4. Apparatus according to claim 1, wherein said control means includes means responsive to the movement of an animal to be treated to cause said metering means to move to the second position whereby the animals are treated automatically with a sprayed dose of said liquid.

5. Apparatus according to claim 1, wherein said control means includes means responsive to the movement of an animal to be treated to cause said metering means to move to the second position whereby the animals are treated automatically with a sprayed dose of said liquid.

6. Apparatus for spraying livestock comprising:
   a source of pressurized liquid to be sprayed on an animal;
   spray nozzle means for receiving pressurized liquid and dispensing it over an animal to be treated;
   liquid dose metering means including a threeway valve and elastic chamber means, said valve having an inlet port in fluid communication with said source of pressurized fluid, a chamber port in fluid communication with said elastic chamber means and an outlet port in fluid communication with said spray nozzle means;
   said valve having a first position providing a fluid path between said inlet port and said chamber port and a second position blocking said inlet port and providing a fluid path between said chamber port and said outlet port;
   said elastic chamber means expanding as said source of pressurized liquid propels a quantity of liquid into it when said valve is in the first position whereby energy is stored in said chamber means and whereby said chamber means contracts and uses said energy to propel said quantity of liquid from said chamber member out said spray nozzle means when said valve is in the second position; and
   control means for controlling the position of said valve to normally maintain it in the first position and for moving it to the second position whereby a metered dose of said liquid is dispersed through said spray nozzle means.

7. Apparatus according to claim 6, wherein said control means includes means responsive to the movement of an animal to be treated to cause said metering means to move to the second position whereby the animals are treated automatically with a sprayed dose of said liquid.

8. Apparatus for spraying livestock comprising:
a source of pressurized liquid to be sprayed on an animal;
spray nozzle means for receiving pressurized liquid and dispersing it over an animal to be treated;
chamber means including propellant means, said chamber means operative in a first mode to receive a quantity of pressurized liquid from said source such that the pressure of said liquid transfers a quantity of energy to said propellant means, and operative in a second mode to discharge said quantity of pressurized liquid in response to energy supplied by said propellant means;
valve means in fluid communication with said source of pressurized liquid, said chamber means and said spray nozzle means, said valve means providing a first position connecting said source of pressurized liquid to said chamber means such that said chamber means is operative in said first mode and a second position connecting said chamber means to said spray nozzle means such that said chamber means is operative in said second mode to discharge said quantity of pressurized liquid and propel it through said spray nozzle means; and
valve position control means normally maintaining said valve means in said first position and operative to move said valve means to said second position whereby an animal is treated with a metered dose of said liquid.

9. Apparatus according to claim 8 wherein said valve position control means includes means responsive to the movement of an animal to be treated to cause said valve means to move to said second position.

10. Apparatus according to claim 9 wherein said means responsive includes a hinged member mechanically linked to control the position of said valve means and wherein said hinged member is moveable by an animal to be treated to cause said valve means to move to said second position.

* * * * *